(12) United States Patent
Iwadate et al.

(10) Patent No.: US 10,349,022 B2
(45) Date of Patent: Jul. 9, 2019

(54) IMAGE PROCESSING APPARATUS, PROJECTOR, IMAGE PROCESSING METHOD, AND STORAGE MEDIUM STORING IMAGE PROCESSING PROGRAM

(71) Applicant: CASIO COMPUTER CO., LTD., Shibuya-ku, Tokyo (JP)

(72) Inventors: Akihito Iwadate, Fussa (JP); Hirokazu Kanda, Ome (JP); Kenji Sato, Ome (JP); Shoichi Okaniwa, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/919,726

(22) Filed: Mar. 13, 2018

(65) Prior Publication Data
US 2018/0278903 A1 Sep. 27, 2018

(30) Foreign Application Priority Data

Mar. 22, 2017 (JP) ................................. 2017-055624
Jan. 29, 2018 (JP) ................................. 2018-012519

(51) Int. Cl.
*H04N 5/445* (2011.01)
*H04N 5/76* (2006.01)
*G06T 7/90* (2017.01)
*H04N 9/31* (2006.01)

(52) U.S. Cl.
CPC ............ *H04N 9/3182* (2013.01); *G06T 7/90* (2017.01); *H04N 5/44504* (2013.01); *H04N 5/76* (2013.01); *H04N 9/3194* (2013.01); *G06T 2207/10024* (2013.01)

(58) Field of Classification Search
CPC .................................................. H04N 21/4316
See application file for complete search history.

(56) References Cited

U.S. PATENT DOCUMENTS

| 2010/0123907 | A1* | 5/2010 | Edgar | G06K 9/00483 358/1.5 |
| 2014/0160046 | A1* | 6/2014 | Kawamoto | H04N 1/00411 345/173 |
| 2015/0084992 | A1* | 3/2015 | Wada | G06T 5/006 345/647 |
| 2015/0269782 | A1* | 9/2015 | Tamura | G06T 19/006 345/633 |
| 2016/0112524 | A1* | 4/2016 | Sutou | G06F 13/00 709/206 |
| 2017/0155831 | A1* | 6/2017 | Jang | G06K 9/00228 |
| 2017/0172419 | A1* | 6/2017 | Oishi | A61B 5/0095 |

FOREIGN PATENT DOCUMENTS

| JP | 2008152692 A | 7/2008 |
| JP | 2011044061 A | 3/2011 |
| JP | 2014102598 A | 6/2014 |

* cited by examiner

*Primary Examiner* — Paulos M Natnael
(74) *Attorney, Agent, or Firm* — Holtz, Holtz & Volek PC

(57) ABSTRACT

An image processing apparatus comprises a hardware processor. The hardware processor is configured to acquire a captured image of an area that includes a display area in which content is displayed by a display device and a peripheral area of the display area; acquire a content image data corresponding to the content; specify a display area in the captured image; produce process information based on the captured image; and perform image processing that includes combining an image based on the content image data with the display area of the captured image by using the process information.

11 Claims, 11 Drawing Sheets

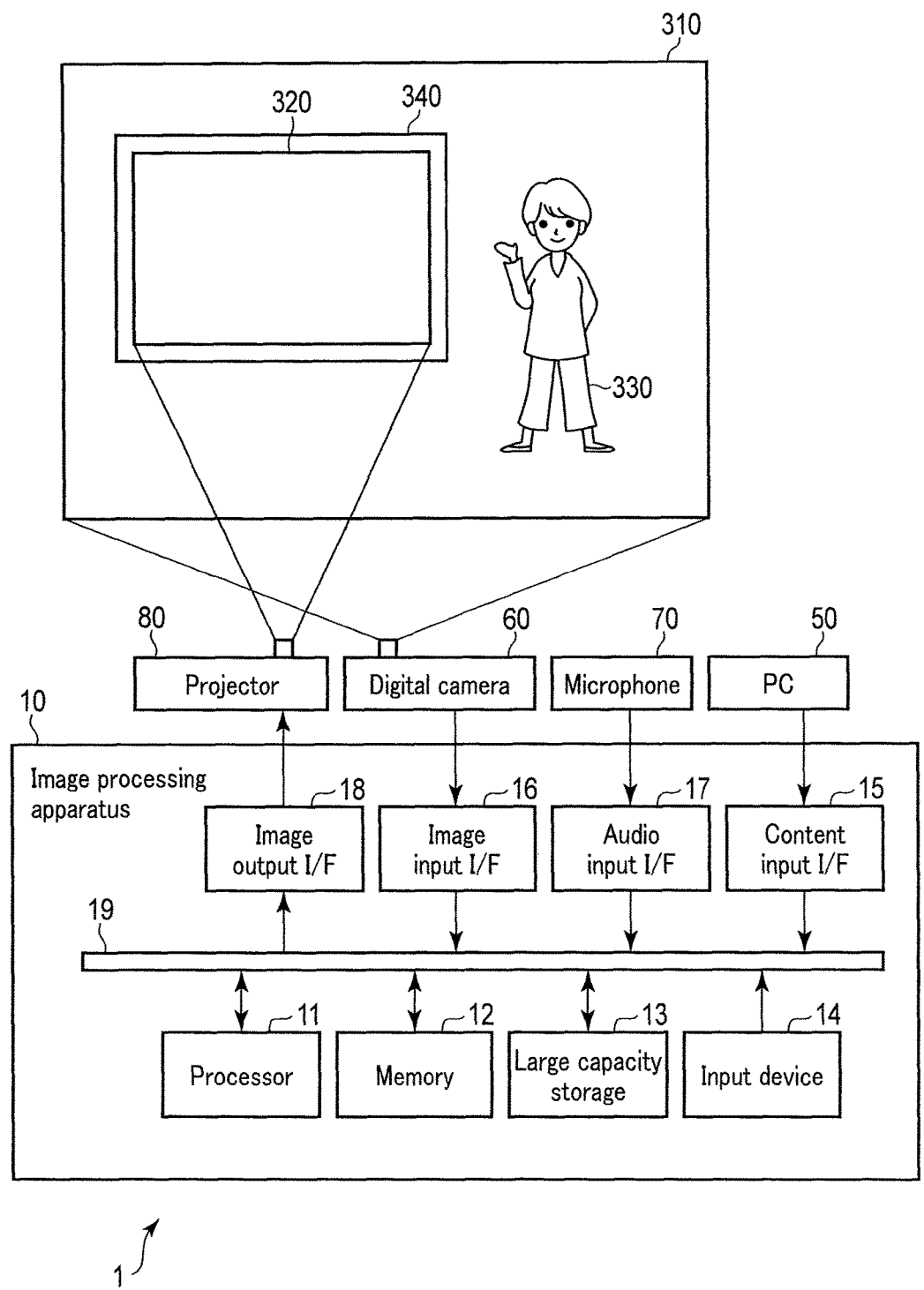
F I G. 1

| Pixel coordinate | Brightness |
|---|---|
| P(0,0) | B(0,0) |
| | |
| P(Xm,0) | B(Xm,0) |
| P(0,1) | B(0,1) |
| | |
| P(Xm,1) | B(Xm,1) |
| | |
| P(0,Yc1) | B(0,Yc1) |
| | |
| P(Xc1,Yc1) | B(Xc1,Yc1) |
| | |
| P(Xc2,Yc1) | B(Xc2,Yc1) |
| | |
| P(Xm,Yc1) | B(Xm,Yc1) |
| | |
| | |
| P(Xm,Ym) | B(Xm,Ym) |

F I G. 5

| Pixel coordinate | α value |
|---|---|
| P(0,0) | 1 |
| \| | \| |
| P(Xm,0) | 1 |
| P(0,1) | 1 |
| \| | \| |
| P(Xm,1) | 1 |
| \| | \| |
| P(0,Yc1) | 1 |
| \| | \| |
| P(Xc1,Yc1) | 0 |
| \| | \| |
| P(Xc2,Yc1) | 0 |
| \| | \| |
| P(Xm,Yc1) | 1 |
| \| | \| |
| \| | \| |
| P(Xm,Ym) | 1 |

F I G. 6

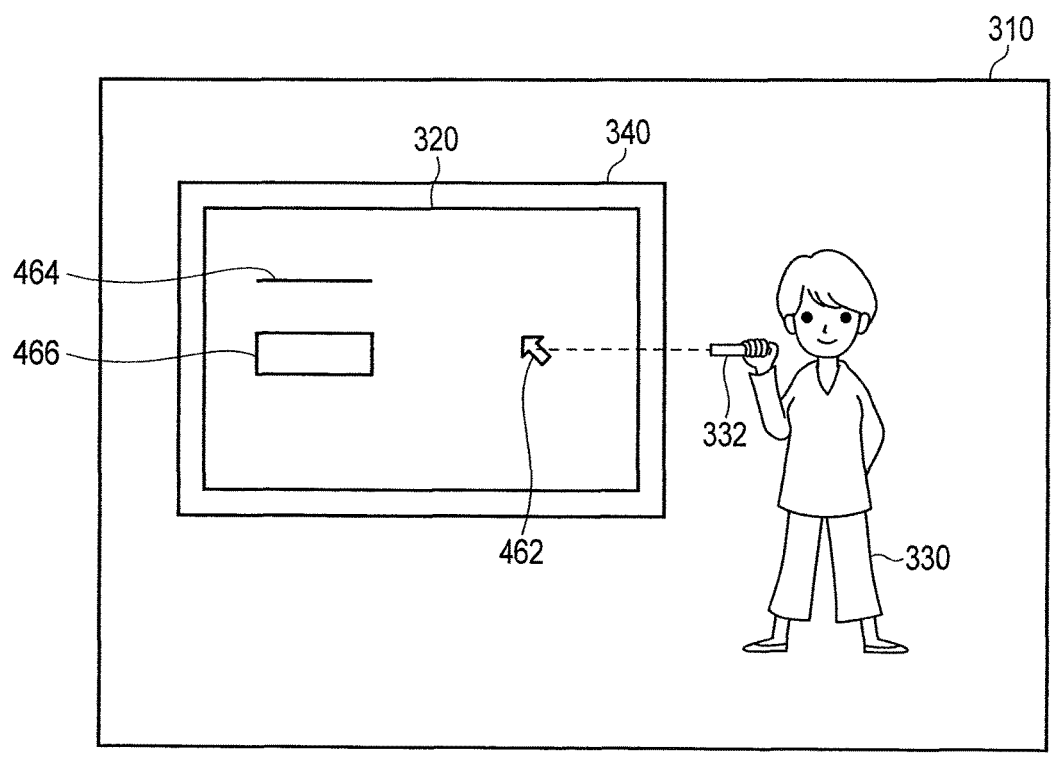
F I G. 13

IMAGE PROCESSING APPARATUS, PROJECTOR, IMAGE PROCESSING METHOD, AND STORAGE MEDIUM STORING IMAGE PROCESSING PROGRAM

CROSS-REFERENCE TO RELATED APPLICATIONS

This application is based upon and claims the benefit of priority from the prior Japanese Patent Application No. 2017-055624 filed on Mar. 22, 2017 and the prior Japanese Patent Application No. 2018-012519 filed on Jan. 29, 2018, the entire contents of all of which are incorporated herein by reference.

BACKGROUND OF THE INVENTION

1. Field of the Invention

The present invention relates to an image processing apparatus, a projector, an image processing method, and a storage medium storing an image processing program.

2. Description of the Related Art

A lecturer may display materials by a large display device or a projector when giving a lecture. Such a lecture may be recorded so that not only an audience in the lecture hall but also many people can watch the lecture, or in order to save the lecture for the record.

For example, Japanese Patent Application No. 2014-102598 discloses a liquid crystal display for displaying pictures and the like related to a presentation, and a presentation device having a video camera for recording the presentation from the start until the end.

When recording the lecture, it is preferable that both of the material displayed on, for example, a display device, and a state of the lecturer are clearly recorded. However, if a focal point of a camera is adjusted to focus on a face of the lecturer, a displayed image such as a material may not come into focus. When a projector displays a material, a geometric correction may be performed to eliminate deformation of a projected image. Such a geometric correction generally degrades image quality of the displayed image.

BRIEF SUMMARY OF THE INVENTION

According to an aspect of the invention, an image processing apparatus comprises a hardware processor. The hardware processor is configured to: acquire a captured image of an area that includes a display area in which content is displayed by a display device and a peripheral area of the display area; acquire a content image data corresponding to the content; specify a display area in the captured image; produce process information based on the captured image; and perform image processing that includes combining an image based on the content image data with the display area of the captured image by using the process information.

According to an aspect of the invention, a projector comprises: the image processing apparatus; a projection unit as the display device that outputs an image to be projected on the display area based on the content image data; and an image capture unit that generates the captured image.

According to an aspect of the invention, an image processing method is implemented by using an image processing apparatus. The method includes: acquiring a captured image of an area that includes a display area in which content is displayed by a display device and a peripheral area of the display area; acquiring content image data corresponding to the content; specifying a display area in the captured image; producing process information based on the captured image; and performing image processing that includes combining an image based on the content image data with the display area of the captured image by using the process information.

According to an aspect of the invention, a non-transitory computer-readable storage medium stores an image processing program to be executed in an image processing apparatus. The image processing program causes the image processing apparatus to execute functions of: acquiring a captured image of an area that includes a display area in which content is displayed by a display device and a peripheral area of the display area; acquiring content image data corresponding to the content; specifying a display area in the captured image; producing process information based on the captured image; and performing image processing that includes combining an image based on the content image data with the display area of the captured image by using the process information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a diagram showing an overview of a configuration example of a lecture video production system according to an embodiment.

FIG. 5 is a diagram schematically showing an overview of an example of a relationship between brightness and coordinates in the image capture area.

FIG. 6 is a diagram schematically showing an overview of an example of mask image data used for alpha blending.

FIG. 13 is a diagram for explaining an overview of an example of the lecture video production processing.

DETAILED DESCRIPTION OF THE INVENTION

[Overview of Lecture Video Production System]

Figure 2:
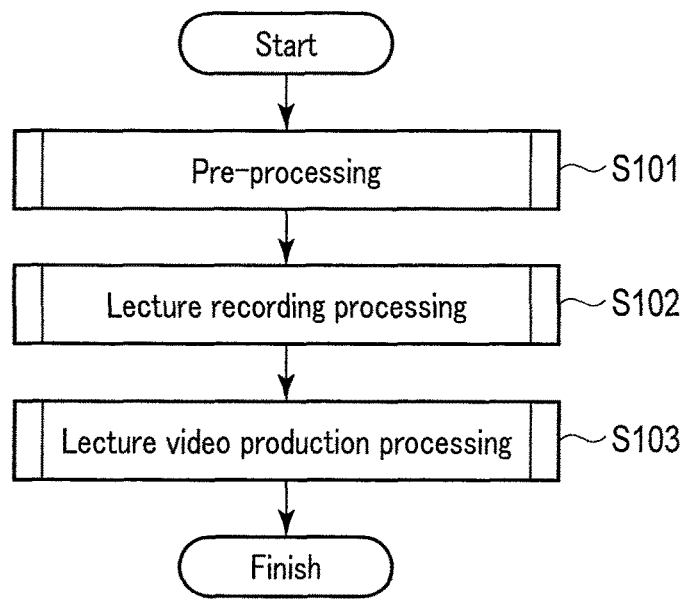
FIG. 2 is a flowchart showing an overview of an example of operation of the lecture video production system.

A lecture video production system according to the present embodiment is used in a situation where lecture material is projected on a screen by using a projector and a lecturer gives a lecture standing next to the screen, for example.

The lecture includes various classes, courses, seminars, presentations, etc.

This lecture video production system has a digital camera.

The digital camera is configured to perform video shooting at an angle that includes, for example, the displayed lecture material and the lecturer.

The lecture video production system stores data of images projected on the screen by using the projector.

The lecture video production system produces a lecture video where an image to be projected is embedded in an area where a material is projected in a video that is shot by the digital camera.

[Configuration of Lecture Video Production System]

FIG. 1 shows an overview of a configuration example of a lecture video production system 1 according to the present embodiment. The lecture video production system 1 comprises an image processing apparatus 10, a personal computer (PC) 50, a digital camera 60, a microphone 70, and a projector 80.

In the PC 50, application software for presentation is running. A user operates this software to operate an image to be projected on a screen 340. The PC 50 outputs data of the content as an image to be projected on the screen 340 in accordance with the user's operation. The content image data that is output by the PC 50 is input to the image processing apparatus 10.

The projector 80 has a projection unit. The projector 80 acquires the content image data output from the PC 50 via the image processing apparatus 10, and projects an image of the content based on the data on the screen 340. The area on which the image is projected will be referred to as a display area 320.

The digital camera 60 has an image capture unit. The digital camera 60 captures an image capture area that includes the screen 340, on which the image is projected, and the lecturer 330 around the screen 340, and produces captured image data that is data of an image that includes the screen 340 and the lecturer 330. The area captured by the digital camera 60 that includes the screen 340 and the lecturer 330 will be referred to as an image capture area 310. The digital camera 60 outputs captured image data. The captured image data output by the digital camera 60 is input to the image processing apparatus 10. In the present embodiment, the captured image data that is input from the digital camera 60 to the image processing apparatus 10 is data of a chronologically continuous video.

The microphone 70 generates audio signals based on sound in the lecture hall that includes voice of the lecturer. The audio signals are input to the image processing apparatus 10.

The image processing apparatus 10 includes a processor 11, a memory 12, a large capacity storage 13, an input device 14, a content input interface (I/F) 15, an image input interface (I/F) 16, an audio input interface (I/F) 17, and an image output interface (I/F) 18, that are connected to each other via a bus line 19.

The content image data output from the PC 50 is input to the image processing apparatus 10 via the content input I/F 15. The captured image data output from the digital camera 60 is input to the image processing apparatus 10 via the image input I/F 16. The audio signals output from the microphone 70 are input to the image processing apparatus 10 via the audio input I/F 17. The content image data is output from the image processing apparatus 10 to the projector 80 via the image output I/F 18.

The processor 11 controls operations of each unit of the image processing apparatus 10. The processor 11 may include an integrated circuit such as a central processing unit (CPU), an application specific integrated circuit (ASIC), a field programmable gate array (FPGA) or a graphics processing unit (GPU). The processor 11 may be one integrated circuit or may be a combination of a plurality of integrated circuits.

The memory 12 may be a random access memory (RAM) realized by a semiconductor integrated circuit, and functions as a main memory, a cash memory, etc. The large capacity storage 13 may be a hard disc or a semiconductor memory.

The content image data input from the PC 50 is recorded and stored in the large capacity storage 13. In other words, the images to be chronologically displayed by the projector 80 based on the content image data input from the PC 50 are stored in the large capacity storage 13 as a video. The images stored in this manner will be referred to as a content video. The captured image data input from the digital camera 60 is recorded and stored in the large capacity storage 13. In other words, the images that are chronologically captured are stored in the large capacity storage 13 as a video based on the captured image data input from the digital camera 60. The images stored in this manner will be referred to as a shot video. The large capacity storage 13 may also store programs and various parameters used in the processor 11.

The input device 14 includes a button switch and a touch panel, for example. The user inputs instructions for operation of the image processing apparatus 10 by using the input device 14.

The processor 11 that operates on an image processing program stored in the large capacity storage 13 implements functions as a captured image acquisition unit, a content acquisition unit, a display area specification unit, a process information production unit, and an image processing unit, as will be described later. The captured image acquisition unit acquires the captured image data generated by capturing the images by the digital camera 60, via the image input I/F 16. The captured image data is data of the captured image generated by capturing an image capture area that includes a display area where content is displayed by the projector 80 as a display device and a peripheral area of the display area. The content acquisition unit acquires the content image data to be displayed by the projector 80 as a display device, via the content input I/F 15. The display area specification unit specifies the display area in the captured image based on the captured image data. The process information production unit produces process information based on the captured image data. The image processing unit combines the video of embedded images produced by image processing based on the content video with the display area in the video of the captured images based on the captured image data, thereby producing a composite video as a lecture video. At this time, the image processing unit may use the process information.

[Operation of Lecture Video Production System]

<Overview of Operation for Lecture Video Production>

The operation of the lecture video production system 1 is roughly divided into three stages. FIG. 2 is a flowchart showing an overview of an example of the operation of the lecture video production system 1.

In step S101, the lecture video production system 1 performs pre-processing. The pre-processing is processing performed prior to the lecture which is an object of the lecture video. In the pre-processing, the display area displayed by the projector 80 in the image capture area which is captured by the digital camera 60 is specified.

In step S102, the lecture video production system 1 performs lecture recording processing. The lecture recording processing is processing to record the lecture which is the object of the lecture video. The digital camera 60 captures a state of the image capture area that includes the lecturer 330 and the screen 340 during the lecture, and the capturing result by the digital camera 60 is stored as a video. Images projected by the projector 80, that is, content is also stored as a video.

In step S103, the lecture video production system 1 performs lecture video production processing. The lecture video production processing is processing performed after the lecture ends. In the lecture video production processing, the captured images and the embedded images are combined to produce a composite video as a lecture video. The captured images used herein are the captured images that have been captured by the digital camera 60 and stored. The embedded images are images of stored content which correspond to the projected images projected by the projector 80.

<Pre-Processing>

Figure 3:
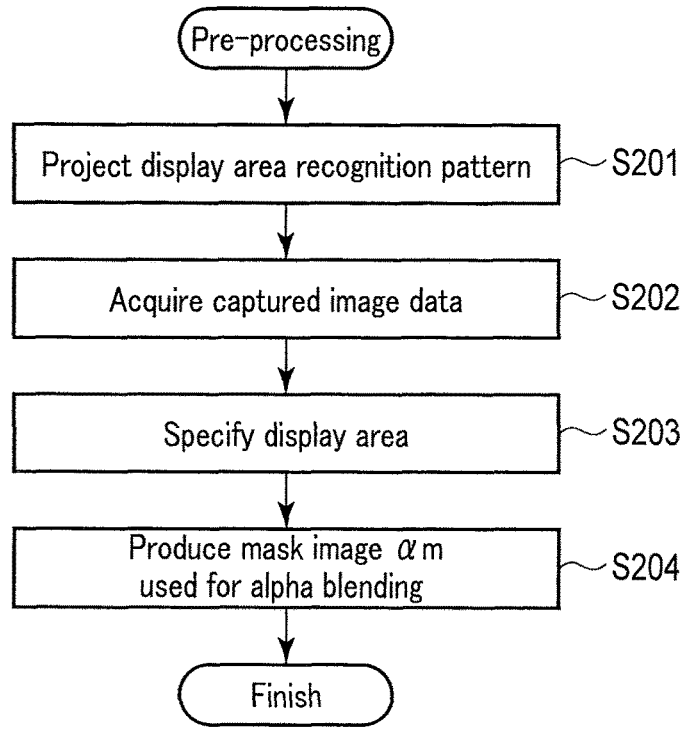
FIG. 3 is a flowchart showing an overview of an example of pre-processing performed in the lecture video production system.

The pre-processing of step S101 performed by the image processing apparatus 10 will be described with reference to the flowchart shown in FIG. 3. The pre-processing is performed prior to the lecture. The start of the pre-processing is carried out by a user's instruction. The pre-processing start instruction is performed by, for example, pushing a start button for the pre-processing included in the input device 14.

In step S201, the processor 11 causes the projector 80 to project a display area recognition pattern. In other words, the processor 11 produces image data for the display area recognition pattern, and outputs the produced image data to the projector 80 via the image output I/F 18. As a result, the projector 80 projects the display area recognition pattern on the screen 340. It is preferable that the display area recognition pattern is an image which may be easily extracted as the display area from the image captured by the digital camera 60. The display area recognition pattern may be an image entirely colored with a single bright color, for example.

It is preferable that a geometric correction, such as a so-called trapezoidal correction, is appropriately performed to the projected image in such a manner that the display area 320 becomes a rectangular shape. It is also preferable that the projected image is properly in focus on the screen 340.

In step S202, the processor 11 acquires the captured image data. In other words, the digital camera 60 captures the image capture area 310 to produce the captured image data, and outputs the captured image data. The processor 11 acquires the captured image data for the image capture area 310 where the display area recognition pattern is projected, via the image input I/F 16.

In step S203, the processor 11 analyzes the captured image data acquired in step S202 to specify the display area in the image capture area in the captured image. When the display area recognition pattern, which is an image in a single bright color, is projected on the display area 320 of the screen 340, the processor 11 may specify the display area in the captured image by analyzing brightness values of the respective coordinates in the image capture area in the captured image and detecting a contrast (a difference in brightness) in the image.

Figure 4:
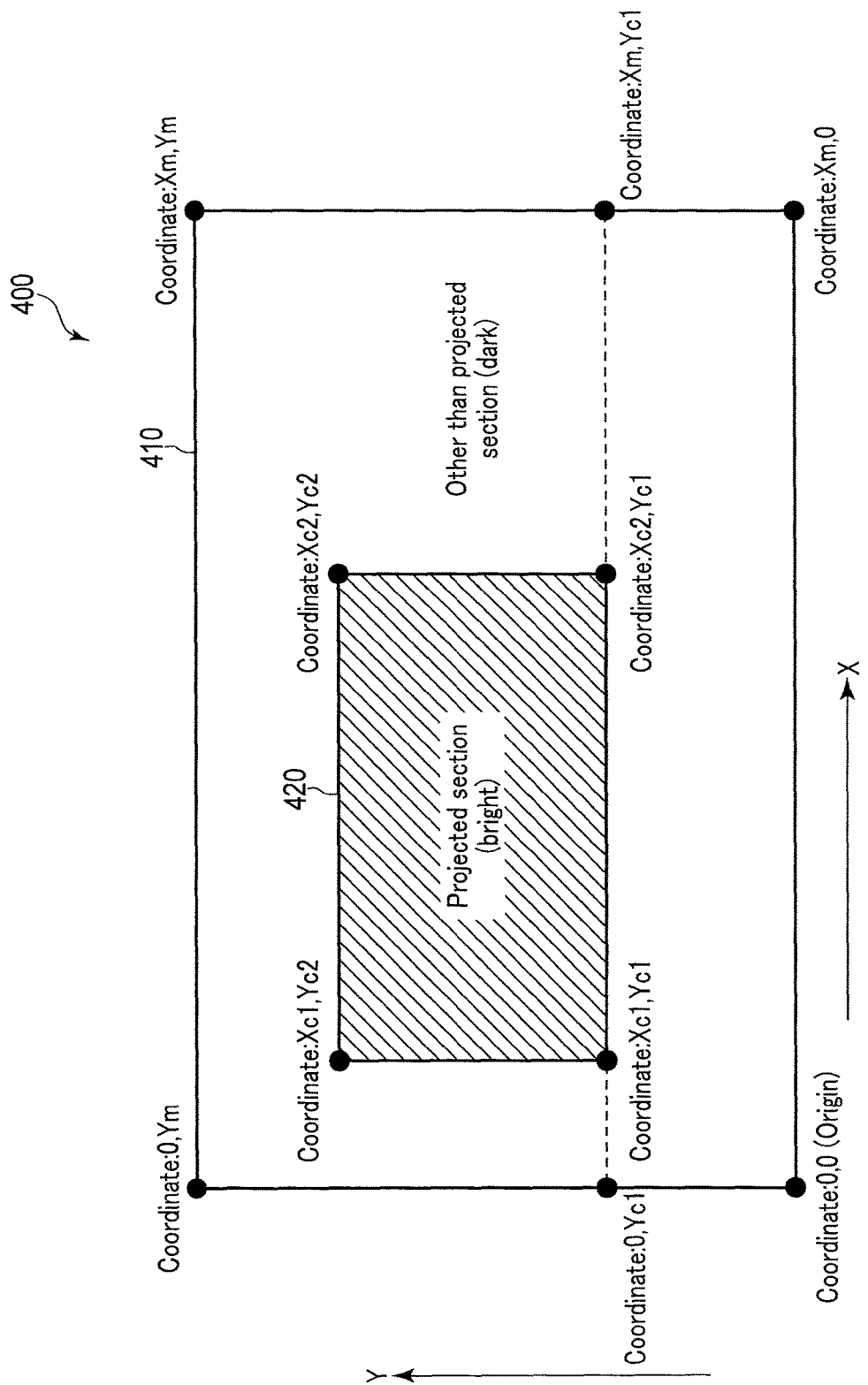
FIG. 4 is a diagram showing an overview of an example of a positional relationship between an image capture area and a display area in a captured image.

FIG. 4 shows an overview of an example of a positional relationship between the image capture area 410 and the display area 420 in the captured image 400. As shown in FIG. 4, the coordinate on the lower left corner of the image capture area 410 is set to the coordinate (0, 0), and the coordinate on the upper right corner of the image capture area 410 is set to the coordinate (Xm, Ym). The display area 420 is included in the image capture area 410. In FIG. 4, the display area 420 is indicated by hatching. The lower left corner of the display area 420 is set to the coordinate (Xc1, Yc1), and the upper right corner of the image capture area 410 is set to the coordinate (Xc2, Yc2).

FIG. 5 schematically shows an overview of an example of brightness of the coordinates of the image capture area 410 which is analyzed by the processor 11 in the case of the example of FIG. 4. As shown in FIG. 5, a brightness value is acquired for each coordinate in the image capture area 410. In FIG. 5, the coordinates of the display area 420 are indicated by hatching.

In step S204, the processor 11 produces a mask image αm used for alpha blending. The processor 11 sets α values of dark points that are determined to be out of the display area 420 in step S203 to 1, and sets α values of bright points that are determined to be the display area 420 to 0.

FIG. 6 schematically shows an overview of an example of the mask image data used for alpha blending. The α values are set to 0 for the coordinates of the display area 420 which are indicated by hatching in FIG. 6. The α values are set to 1 for the other coordinates. In the mask image data used for alpha blending for which such α values are set, the display area 420 indicated by hatching in FIG. 4 is completely transparent, and the other area is completely opaque.

The pre-processing is finished after producing the mask image data used for alpha blending as described above.

One simple method for specifying the display area 420 is described herein. However, a method for specifying the display area 420 is not limited to the above method. Various methods may be used for specifying the display area 420.

<Lecture Recording Processing>

Figure 7:
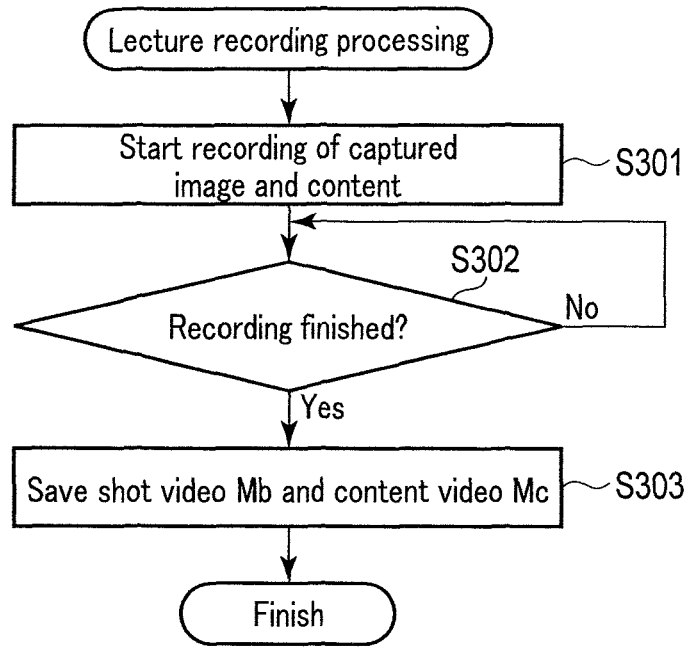
FIG. 7 is a flowchart showing an overview of an example of lecture recording processing performed in the lecture video production system.

The lecture recording processing of step S102 performed by the image processing apparatus 10 will be described with reference to the flowchart shown in FIG. 7. The start of the lecture recording processing is carried out by a user's instruction, the instruction being input before the lecture starts. The instruction to start the lecture recording processing may be performed by pushing a recording start button included in the input device 14.

In step S301, the processor 11 starts recording for the captured image data acquired from the digital camera 60 and the content image data acquired from the PC 50. The captured images and the content are respectively associated with time information, and stored in the large capacity storage 13 as a video.

In step S302, the video processor 11 determines whether or not to finish the recording. For example, if a user's instruction to finish the recording is input, it is determined that the recording should be finished. The instruction to finish the recording may be performed by pushing a recording finish button included in the input device 14 after the lecture ends. If determination that the recording should not be finished is made in step S302, the processing repeats step S302. At this time, the recording of the captured images and the content continues, and the storing of the captured images and the content associated with the time information as a video continues in the large capacity storage 13. If determination that the recording should be finished is made in step S302, the processing proceeds to step S303.

In step S303, the processor 11 generates files of a shot video Mb which is a video for the captured images and a content video Mc which is a video for the content, and saves them in the large capacity storage 13.

As described above, the lecture recording processing is finished by saving the shot video Mb and the content video Mc.

<Lecture Video Production Processing>

Figure 8:
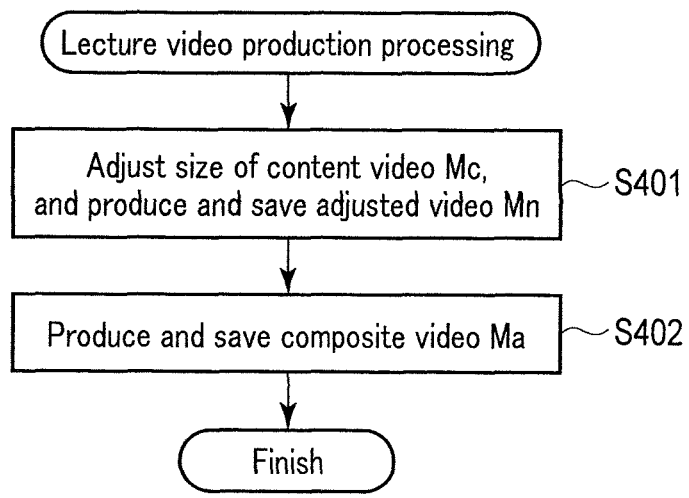
FIG. 8 is a flowchart showing an overview of an example of lecture video production processing performed in the lecture video production system.

The lecture video production processing of step S103 performed by the image processing apparatus 10 will be described with reference to the flowchart shown in FIG. 8. The start of the lecture video production processing is carried out by a user's instruction. The instruction to start the lecture video production processing may be performed by pushing the lecture video production button included in the input device 14 after the lecture ends.

In step S401, the processor 11 adjusts a size and a position of the content video Mc and produces a video as an embedded image. In the present embodiment, a video produced by adjusting the size and the position of the content video Mc will be referred to as an adjusted video Mn. The entire image size of the adjusted video Mn is adjusted to the same size as the image size of the shot video Mb. In other words, the entire image size of the adjusted video Mn is adjusted to the size corresponding to (0, 0)-(Xm, Ym), if represented by the coordinates in the example shown in FIG. 4. The processor 11 shrinks or expands the content video Mc in accordance with the size of the part corresponding to the display area 420. Furthermore, the processor 11 positions the content video Mc that has been shrunk or expanded to a position corresponding to the display area 420. In this manner, the adjusted video Mn, where the position and the size of the content video Mc are adjusted to a part corresponding to the display area 420, is produced. In other words, the position and the size of the content video Mc are adjusted to (Xc1, Yc1)-(Xc2, Yc2) as indicated by coordinates in the example shown in FIG. 4. The time information included in the content video Mc is inherited by the adjusted video Mn. The produced adjusted video Mn is saved in the large capacity storage 13, for example.

In step S402, the processor 11 produces a video by combining the shot video Mb with the adjusted video Mn. In the present embodiment, a video acquired by combining the shot video Mb with the adjusted video Mn will be referred to as a composite video Ma. For example, the processor 11 produces the composite video Ma by alpha blending using the mask image αm in which the shot video Mb is a foreground and the adjusted video Mn is a background. At this time, the shot video Mb and the adjusted video Mn are adjusted by using the time information included in these videos so as to synchronize with each other. The produced composite video Ma is saved in, for example, the large capacity storage 13. This composite video Ma is an intended lecture video. The above is the operation of the lecture video production system 1.

The lecture video production system 1 according to the present embodiment produces a composite video Ma in which an image at a position corresponding to the display area 320 in a shot video Mb that is shot by the digital camera 60 is replaced with a content video Mc. This composite video Ma has an excellent visibility. In general, a lecturer 330 is focused during the capturing by the digital camera 60. As a result, a projected image projected on the screen 340 may be out of focus. A geometric correction such as a so-called trapezoidal correction may be performed to the projected image so that the image is projected on the display area 320 having a rectangular shape. By such a correction, the brightness may decrease and the image quality may be degraded in the projected image. Furthermore, a noise, such as spoke light that may be generated when a DLP projector is used as the projector 80, may be caused in the projected image. The spoke light is hardly recognized when the projected image is observed with the physical eyes, but may be recognized in a captured image. Since the image of the display area 420 is produced based on the content image data in the composite video Ma produced in the present embodiment, an out of focus, decrease of brightness, image quality degradation, and noise superimposition as described above, for example, are not caused in the image of the display area 420.

A modification of the present embodiment will be described. Differences from the above embodiment will be described, and overlapping descriptions for the same portions will be omitted by using the same reference numerals. In the present modification, a composite video Ma processed in accordance with the shot video Mb, which is acquired using the digital camera 60, is produced.

There is a case where a color tone of the image in the display area 420 included in the shot video Mb and a color tone of the content video Mc is different from each other depending on shooting conditions, etc. In the present modification, processing to match the color tone of the content video Mc to the color tone of the image in the display area 420 included in the shot video Mb is performed to produce an adjusted video Mn. The adjusted video Mn produced in such a manner is used to produce a composite video Ma. A composite video Ma in which the entire video picture has a natural color tone can be thereby produced. There are various methods of making the color tone of the content video Mc match the color tone of the image in the display area 420 included in the shot video Mb. Examples of such methods will be described below.

Figure 9:
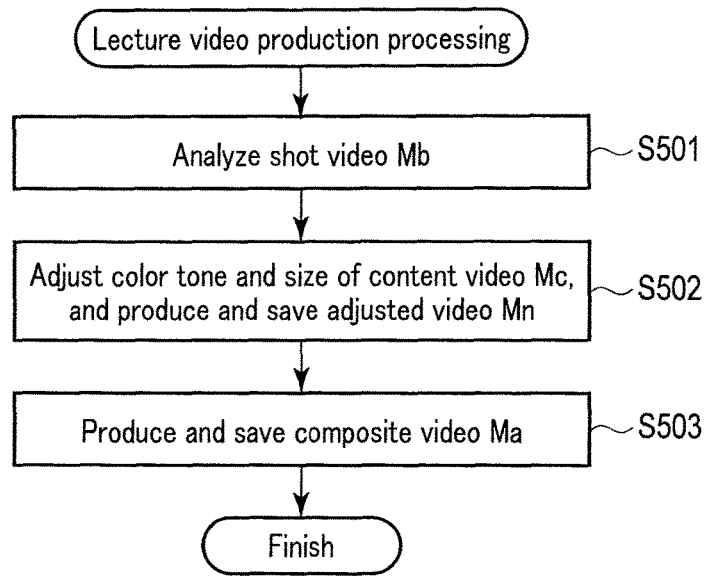
FIG. 9 is a flowchart showing an overview of an example of the lecture video production processing.

The first method of the present modification will be described. The lecture video production processing of this method will be described with reference to the flowchart shown in FIG. 9.

In step S501, the processor 11 analyzes the shot video Mb. In more detail, the processor 11 specifies information of the color tone in the display area 420 included in the images included in the shot video Mb. The color tone may be changed by the following factors. The color tone may be changed by shooting conditions, such as a white balance at the time of shooting by the digital camera 60. The color tone may also be changed by projecting conditions such as characteristics of the projector 80 including characteristics of a light source, etc. The color tone may also be changed by environmental conditions, such as lighting conditions of the lecture hall.

In step S502, the processor 11 adjusts the size of the content video Mc to produce an adjusted video Mn. At this time, the processor 11 adjusts the color tone of the content video Mc in accordance with an analysis result of step S501. In other words, the processor 11 performs image processing in such a manner that the color tone of the content video Mc matches the color tone of the image in the display area 420 included in the shot video Mb. In this manner, the adjusted video Mn in which the color tone is adjusted and in which the position and the size of the content video Mc are adjusted to a section corresponding to the display area 420 is produced.

The shot video Mb may be analyzed for an entire time period of the video, and the color tone of the adjusted video Mn may be adjusted under different conditions for different periods of time. The shot video Mb may be analyzed only for the initial state of the lecture, and the color tone of the adjusted video Mn may be adjusted under the same conditions for the entire time period of the video. The shot video Mb may be repeatedly analyzed for a predetermined period of time, and the color tone of the adjusted video Mn may be adjusted under conditions that are reset for every predetermined period of time.

The time information included in the content video Mc is inherited by the adjusted video Mn. The produced adjusted video Mn is saved in the large capacity storage 13, for example.

In step S503, the processor 11 produces a composite video Ma in which the shot video Mb and the adjusted video Mn are combined. The produced composite video Ma is saved in, for example, the large capacity storage 13. This composite video Ma is an intended lecture video.

Thus, it is possible to produce the composite video Ma having characteristics in which the entire video picture has a natural color tone.

An example of image processing of adjusting the color tone of the adjusted video Mn produced based on the content video Mc is described in the above, but the configuration is not limited thereto. The color tone of the shot video Mb, instead of the adjusted video Mn produced based on the content video Mc, may be adjusted by image processing. In this case, the processor 11 performs image processing of adjusting the color tone of the shot video Mb in such a manner that the color tone of the area other than the display area 420 in the shot video Mb matches the non-adjusted color tone of the content video Mc. The processor 11 produces the composite video Ma by combining the adjusted video Mn with the shot video Mb of which color tone is adjusted. The processor 11 may perform processing of adjusting the color tones of both of the adjusted video Mn and the shot video Mb so as to make the color tones of these videos match.

The second method of the present modification will be described. In the first method, the color tone information in the display area 420 is specified by analyzing the shot video Mb. In this method, the color tone information in the display area 420 is specified based on various conditions at the time of shooting that are stored in association with data of the shot video Mb.

For example, in step S303 of the lecture recording processing, one or more of various settings, such as a setting of a white balance of the digital camera 60 at the time of shooting and a setting of the projector 80, are stored in association with data of the shot video Mb.

In the lecture video production processing, the processor 11 reads the above information associated with the shot video Mb along with the shot video Mb. The processor 11 adjusts the color tone of the content video Mc based on the information to produce the adjusted video Mn in the manner similar to the processing in step S502. The other processing is similar to that in the first method.

Thus, it is possible to also produce the composite video Ma having characteristics in which the entire video picture has a natural color tone in the above manner.

Another modification of the embodiment will be described. Differences from the above embodiment will be described, and overlapping descriptions for the same portions will be omitted by using the same reference numerals. Also in the present modification, a composite video Ma processed in accordance with the shot video Mb, which is acquired using the digital camera 60, is produced.

Figure 10:
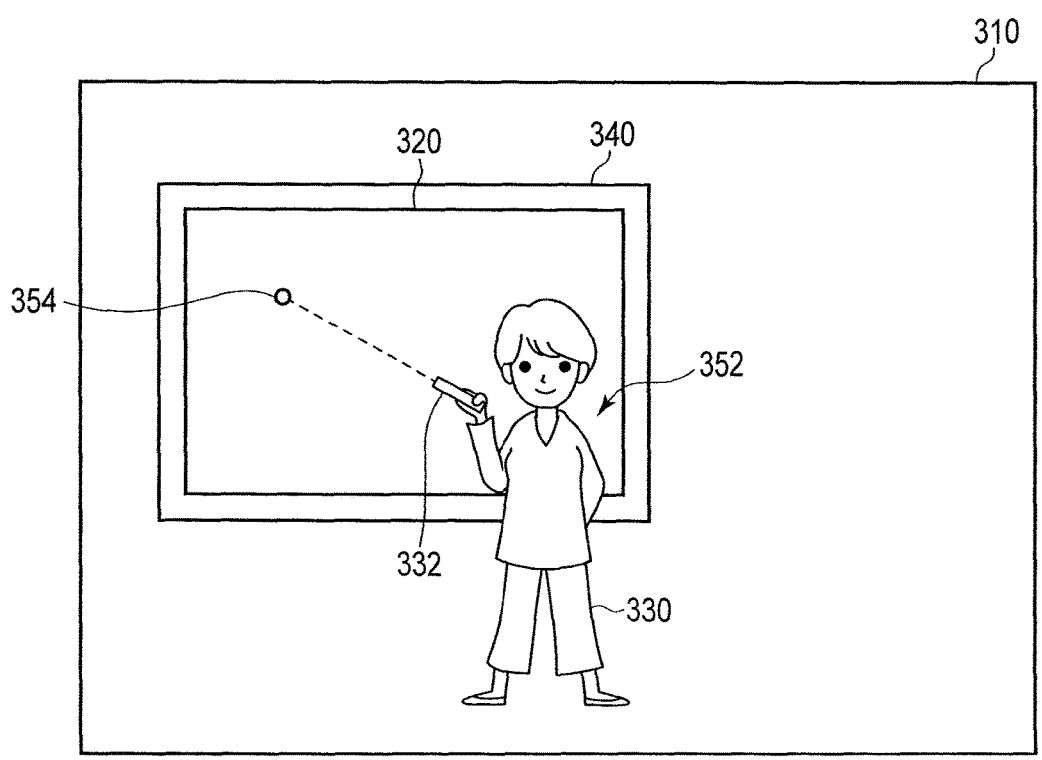
FIG. 10 is a diagram for explaining an overview of an example of the lecture video production processing.

In the above embodiment, an example of the case where the display area in the captured image is specified as a fixed area in advance by the pre-processing is described. Meanwhile, a border between the display area and the peripheral area other than the display area may change with time when, for example, the lecturer or a pointer enters the display area. When a part 352 of the lecturer 330 overlaps with the original display area 320 as shown in FIG. 10, if the processing as described in the above embodiment is performed, the part 352 of the lecturer 330 that overlaps with the original display area 320 disappears in the composite video Ma. If the processing as described in the above embodiment is performed a bright point 354 indicated by a laser pointer 332 that the lecturer 330 holds is not reproduced in the composite video Ma. To deal with such a situation, the image processing apparatus 10 may be configured in such a manner that the display area changes with time.

The border between the display area and the peripheral area may be easily specified by comparing an image of the content with the captured image. When the lecturer 330 does not enter the display area 320, the image of the content matches the image of the display area 320 of the captured image. On the other hand, when the lecturer enters the display area 320, the image of the display area 320 of the captured image does not match the content in a part where the lecturer enters in the image of the content. Accordingly, the border between the display area and the peripheral area may be specified based on such a non-matching area.

When the bright point 354 formed by the laser pointer 332 is included in the captured image, the bright point 354 may be specified as a point with high brightness since the bright point 354 has very high brightness.

In either case, the α value of alpha blending of a position where the captured image should be displayed, for example a position where the lecturer is captured in the display area 420, should be changed to 1 even if the position is in the display area 420. By such processing, a natural lecture video may be produced even if something other than the displayed image is included in the display area 420. Some examples of processing methods according to the present modification will be further described below with reference to the drawings.

Figure 11:
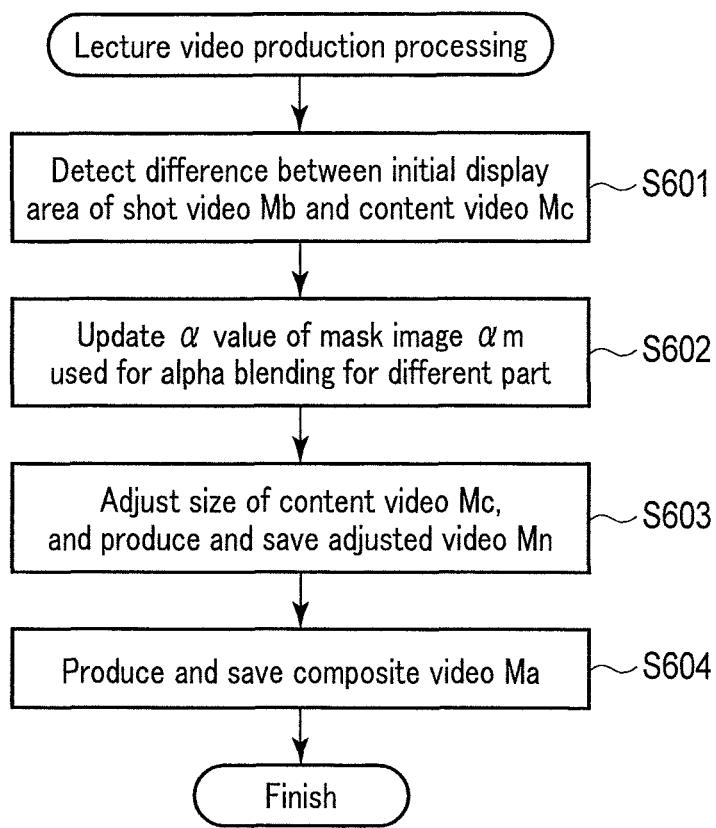
FIG. 11 is a flowchart showing an overview of an example of the lecture video production processing.

The lecture video production processing of this method will be described with reference to the flowchart shown in FIG. 11.

In step S601, the processor 11 analyzes an initial display area of the shot video Mb and the content video Mc to detect a difference of pixels at each point of time during the lecture. The initial display area is the display area 420 of the shot video Mb in the initial state in which the lecturer 330, etc. do not enter the area of the screen 340. The display area specified by the pre-processing which is described with reference to FIG. 3 may be set as the initial display area. The difference between the initial display area of the shot video Mb and the content video Mc is an area where pixels in the initial display area and not corresponding to pixels of the content video Mc should be indicated in a composite video Ma. For example, the image of the lecturer 330 who enters the initial display area is detected as a difference. The image of the bright point 354 on the initial display area by the laser pointer 332 is also detected as a difference.

In step S602, the processor 11 updates the α value of a mask image αm used for alpha blending for the different part detected in step S601. For example, the α value is set to 1 for the part where a difference is detected. In this manner, the mask image αm used for alpha blending, in which the α value may be different in each pixel of the initial display area at each point of time, is produced.

In other words, the initial display area excluding the different part is a new display area. An image based on the content video Mc is combined with this new display area.

In step S603, the processor 11 adjusts the size of the content video Mc to produce and save the adjusted video Mn, in the manner similar to the above embodiment.

In step S604, the processor 11 combines the shot video Mb and the adjusted video Mn by using the mask image αm used for alpha blending produced in step S602 to produce a composite video Ma. The produced composite video Ma is saved in, for example, the large capacity storage 13. This composite video Ma is an intended lecture video. In this composite video Ma, an image based on the shot video Mb, instead of the content video Mc, is displayed for a part corresponding to the lecturer 330 and the bright point 354 of the laser pointer 332 that have entered the initial display area.

Thus, it is possible to produce the natural composite video Ma even if the shot video Mb includes an image of the lecturer 330 or the bright point 354 that has entered between the digital camera 60 and the display area 320.

This method may include processing of adjusting the color tone of the content video Mc based on the shot video Mb.

The adjustment of the color tone is not always uniformly performed to all of the pixels of the content video Mc or the shot video Mb. Another example of adjusting the color tone will be described below as the second method.

Figure 12:
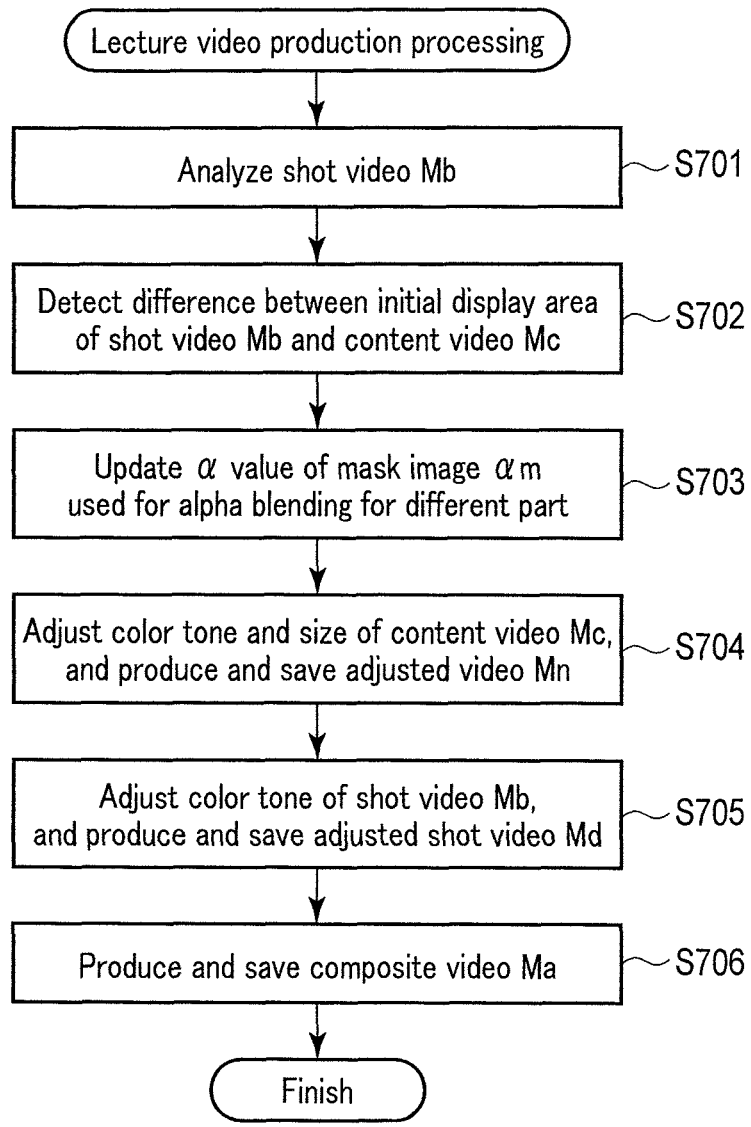
FIG. 12 is a flowchart showing an overview of an example of the lecture video production processing.

The lecture video production processing of this method will be described with reference to the flowchart shown in FIG. 12.

In step S701, the processor 11 analyzes the color tone of the shot video Mb. In other words, the processor 11 specifies information of a color tone in the display area 420 included in the images of the shot video Mb.

In step S702, the processor 11 analyzes the initial display area of the shot video Mb and the content video Mc to detect a difference of corresponding pixels at each point of time during the lecture, in the manner similar to step S601 of the above-mentioned method.

In step S703, the processor 11 updates the α value of the mask image αm used for alpha blending for the different part specified in step S702, in the manner similar to step S602 of the above-mentioned method.

In step S704, the processor 11 adjusts the size of the content video Mc to produce an adjusted video Mn. The processor 11 also adjusts the color tone of the content video Mc by image processing based on an analysis result of step S701 to produce the adjusted video Mn. The processor 11 performs image processing of adjusting the color tone especially on the border between the shot video Mb and the content video Mc that are combined with each other in such a manner that the images are smoothly connected. At this time, the processor 11 may uniformly adjust the color tone of the entire part of the content video Mc. The processor 11 may also specify a position that becomes the border between the image that is based on the shot video Mb and the image that is based on the content video Mc when combining these videos, based on the difference specified in step S702, and may adjust the color tone by using the position. This border corresponds to an edge of the new display area acquired by excluding the different part from the initial display area. The processor 11 may also adjust the color tone of the content video Mc in stages toward the border in the border part in such a manner that the specified border looks natural. Such adjustment of the color tone may be performed to the entire length of the edge of the display area, or may be performed to the edge of the display area corresponding to the periphery of the different part.

In step S705, the processor 11 adjusts the color tone of the shot video Mb by image processing based on the analysis result of step S701. In the present modification, a video produced by this adjustment of the color tone of the shot video Mb will be referred to as an adjusted shot video Md. The processor 11 performs image processing of adjusting the color tone especially on the border between the shot video Mb and the content video Mc that are combined with each other in such a manner that the images are smoothly connected. At this time, the processor 11 may uniformly adjust the color tone of the entire part of the shot video Mb. The processor 11 may also specify the edge of the display area specified based on the difference detected in step S702, and may adjust the color tone by using this edge. The processor 11 may also adjust the color tone of the shot video Mb in stages toward the border in the border part in such a manner that the specified edge looks natural. Such adjustment of the color tone may be performed to the entire length of the edge of the display area, or may be performed to the edge of the display area corresponding to the periphery of the different part.

In step S706, the processor 11 combines the adjusted shot video Md and the adjusted video Mn by using the mask image αm used for alpha blending produced in step S703 to produce the composite video Ma. The produced composite video Ma is saved in, for example, the large capacity storage 13. This composite video Ma is an intended lecture video.

In this composite video Ma, an image based on the shot video Mb, instead of the content video Mc, is displayed for a part of the lecturer 330 or the bright point 354 of the laser pointer 332 that enters the display area 320. By this method, a border between the adjusted shot video Md and the adjusted video Mn that are combined with each other becomes smooth.

In the above example, an example in which color tones of both of the shot video Mb and the content video Mc are adjusted is described, but the configuration is not limited thereto. A color tone of either of the shot video Mb or the content video Mc may be adjusted. The border between the shot video Mb and the content video Mc may be smoothed by using a mask image cam used for alpha blending, regardless of, or in addition to, adjustment of the color tones of the shot video Mb or the content video Mc. In other words, in a border part, a composite ratio of the adjusted shot video Md and the adjusted video Mn may be changed in stages according to a distance from the border.

A modification of the above embodiment will be described. Differences from the above embodiment will be described, and overlapping descriptions for the same portions will be omitted by using the same reference numerals. Similar to the foregoing modifications, a composite video Ma processed in accordance with the shot video Mb, which is acquired using the digital camera 60, is produced. In the present modification, an image that does not exist in the actual lecture is superimposed on the composite video Ma based on the shot video Mb.

For example, as shown in FIG. 13, when the lecturer 330 makes a predetermined movement by using a laser pointer 332, a display in accordance with the movement is included in the composite video Ma. For example, when a position of the bright point is changed to move back and forth for a predetermined number of times, a line 464 as a superimposition image according to a track of the bright point is superimposed on the composite video Ma, resulting in that the line 464 is included in the composite video Ma. For example, when the lecturer 330 wishes to underline a part that the lecturer wishes to emphasize in the content, the lecturer 330 may move the position of the bright point back and forth for the predetermined number of times on the position. When the position of the bright point is changed to frame a certain position, a frame line 466 according to the track of the bright point is included in the composite video Ma. For example, when the lecturer 330 wishes to frame a part to emphasize with a square or a circle, the lecturer 330 may move the laser pointer 332 to frame the part by the bright point. For example, an arrow-shaped figure 462 may be displayed on the bright point part in the composite video Ma in order to emphasize a position indicated by the laser pointer 332.

Figure 14:
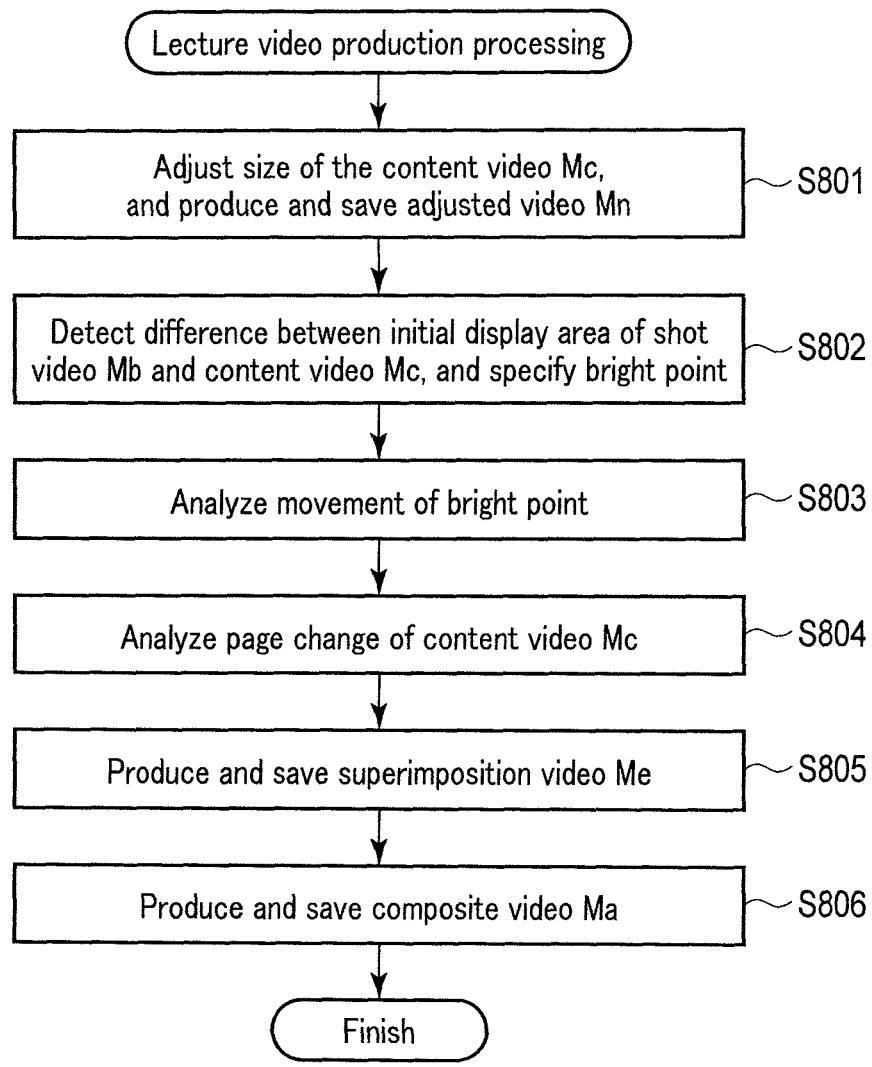
FIG. 14 is a flowchart showing an overview of an example of the lecture video production processing.

The lecture video production processing of the present modification will be explained with reference to the flowchart shown in FIG. 14.

In step S801, the processor 11 adjusts the size of the content video Mc to produce an adjusted video Mn.

In step S802, the processor 11 analyzes an initial display area of the shot video Mb and the content video Mc to detect a difference of pixels at each point of time during the lecture. In the present modification, the processor 11 specifies the bright point by the laser pointer 332 based on this difference. The processor 11 specifies the bright point as an indicated position which is a point indicated by the lecturer 330 in the initial display area.

In step S803, the processor 11 analyzes a movement of the bright point which is the indicated position specified in step S802. For example, the processor 11 chronologically analyzes whether or not the bright point moves back and forth over the same position for the predetermined number of times, or whether or not the bright point moves to frame a certain position.

In step S804, the processor 11 analyzes, for example, whether or not a displayed page of the content is changed in the content video Mc. The processor 11 may specify whether or not a page of the content is flipped by, for example, analyzing the content video Mc. In a lecture recording processing, a timing of operation to flip pages of the content by the lecturer 330 may be stored, and whether or not the page of the content is flipped may be determined by the processor 11 based on the stored timing.

In step S805, the processor 11 produces a video to be superimposed on the shot video Mb and the adjusted video Mn and displayed in the composite video Ma based on analysis results of step S803 and step S804, and saves the video in, for example, the large capacity storage 13. The video as produced herein that includes figures which are not included in the shot video Mb or the content video Mc will be referred to as a superimposition video Me. For example, when the bright point moves back and forth over the same position for the predetermined time, the processor 11 produces the superimposition video Me that includes the line 464 on the position so as to display an underline on the position. When the bright point frames a certain position, the processor 11 produces the superimposition video Me that includes the frame line 466 on the position so as to display a frame line along the position of the bright point. The processor 11 also produces the superimposition video Me that includes the arrow-shaped figure 462 at the position of the bright point so as to display the arrow-shaped figure 462 in accordance with the position of the bright point.

The line 464, etc. in the superimposition video, Me may be configured to be deleted in accordance with a change of the page of the content. In other words, the lecture video is difficult to understand if an underline, etc. corresponding to the content of a previous page remains after the page of the content changes. Accordingly, the superimposition video Me is produced in such a manner that the underline, etc. are deleted at the same time as page flipping of the content.

In step S806, processor 11 combines the shot video Mb and the adjusted video Mn by using the mask image αm used for alpha blending. The processor 11 further combines the superimposition video Me to produce the composite video Ma. The produced composite video Ma is saved in, for example, the large capacity storage 13. This composite video Ma is an intended lecture video.

This composite video Ma includes an image according to the movement of the bright point by the laser pointer 332. As a result, the lecture video becomes a video with further information added to the actual lecture that is easier to understand.

The operation of displaying a line when the bright point moves back and forth for the predetermined number of times, or the operation of displaying the frame line when the bright point frames a given position as described herein, is an example of a relationship between movements of the bright point as the indicated position and the displayed image.

In the above example, examples in which the bright point is detected based on the difference between the shot video Mb and the content video Mc is described, but the configuration is not limited thereto. For example, a point that has brightness equal to or more than a predetermined brightness included in the shot video Mb may be specified as the bright point by the laser pointer. A laser pointer that shows a predetermined blinking pattern that is not recognizable by the physical eyes but may be specified in the shot video Mb, may be used. In this case, the position of the bright point may be specified based on the blinking pattern.

The above modification describes an example in which the bright point of the laser pointer 332 is used as the indicated position and the superimposition video Me is produced based on this bright point. However, the configuration is not limited thereto, and an image to be superimposed may be produced based on a gesture of the lecturer 330. For example, a position indicated by a hand of the lecturer 330 may be set as an indicated position, and when a predetermined movement by the lecturer 330 is detected, an image according to the movement may be produced as a superimposition image.

If an image to be superimposed may be produced in real time, the image may be projected by the projector 80. In this case, since an underline, etc. are displayed on the screen 340, an image that is easy for an actual audience of the lecture to understand may be displayed.

The present embodiment may be configured to be implemented in combination with any of the above modifications.

The case in which an image of a lecture material is presented by the display device, and a lecturer gives a lecture standing next to the image is described above. The example in which a projector is used as a display device is described herein. A display device that presents a material is not limited to a projector. For example, various devices, such as a liquid crystal display, may be used instead of a projector. In this case, the portions described as "project" in the descriptions of any of the above embodiment and the modifications may be replaced with "display." This matter applies to the modification described below. In the above modification, the case in which, for example, the lecturer 330 enters the display area 320 is discussed. In such a case, if the display device is a projector, the lecturer 330 enters between the screen and the projector, and an image is projected on the lecturer 330. Meanwhile, if the display device is a liquid crystal display, etc., the lecturer 330 enters between the digital camera and the display, etc.

The case in which a projecting condition is adjusted in such a manner that the display area 320 becomes a rectangular shape is described, but the display area 320 is not necessarily a rectangular shape. A shape of the adjusted video Mn to be combined may be appropriately corrected by image processing in accordance with the display area 420 that is specified based on the captured image. By such image processing, an appropriate lecture video may be produced even if a shape of the display area 320 does not match a shape of the image of the content.

When changing a projected image, a user operates the PC 50 or the projector 80. For example, the user operates the PC 50 when flipping pages of the projected image, and the user operates the projector 80 when performing a trapezoidal correction of the projected image. The processor 11 may acquire information of the operation performed to the PC 50 or the projector 80, and may produce the adjusted video Mn by using the information.

Furthermore, for example, even if the content image data that is output by the PC 50 does not change, a part of the projected image may be expanded and the expanded part may be moved from side to side and up and down by using functions of the projector 80. In such a case, the processor 11 may acquire change information relating to the operation that is input to the projector 80, and may use the acquired information to produce the adjusted video Mn. Such a method makes production of the adjusted video Mn easier than using only the shot video Mb to determine the adjusted video Mn to be produced by image processing.

The image as content that is output from the PC 50 and projected by the projector 80 may be a still image or a video. The content may include sound. The sound included in the content may be output by the projector 80 or other means. The sound in the content included in the lecture video is recorded by using the microphone 70. This sound may be processed in the similar manner to the voice of the lecturer, or may be produced based on audio data that is input from the PC 50 to the image processing apparatus 10.

In the above embodiment and modifications, image composition by a method using alpha blending is described, but the composition method is not limited thereto. Various methods may be used for image composition.

The above embodiment and modifications describe that the image processing apparatus 10 performs all of the pre-processing, the lecture recording processing, and the lecture video production processing, but the configuration is not limited thereto. For example, the lecture video production processing may be performed by a device different from a device that performs the pre-processing and the lecture recording processing. If the shot video Mb, the content video Mc, and the mask image αm are provided, the lecture video production processing may be performed by a PC, a server, or other equipment. based on these elements.

Furthermore, the above embodiment and modifications describe that the image processing apparatus 10 produces a lecture video by image composition, but the configuration is not limited thereto. For example, if image quality of a part in the display area 420 of the shot video Mb is degraded, only the part may be corrected based on the content video Mc. Accordingly, a correction may be made by using information of a part corresponding to the part of the content video Mc in accordance with the degradation degree of the image quality of the part. The image processing is performed to make the display area 420 of the shot video Mb have sufficiently high quality for a person who watches a lecture video, and the image processing is not limited to composition of an embedded image.

The shot video Mb and the content video Mc may be combined in real time if the processor 11 has sufficiently high processing ability. If a lecture video may be produced in real time, an audience in a remote location may watch the lecture with high-quality images at the same time as the lecture by sending the produced lecture video to the remote location.

An example in which the image processing apparatus 10 is provided independently from the PC 50 and the projector 80 is described. The functions as the image processing apparatus 10 may be provided in the projector 80, or may be provided in the PC 50. For example, the above functions may be provided as a projector where the projector 80, the digital camera 60, the microphone 70, and the image processing apparatus 10 that are shown in FIG. 1 are put in a single casing. A position where the projector is arranged is suitable for projecting a displayed image, and this position is suitable for simultaneously capturing a projected image and a lecturer. Content image data is input to the projector generally for performing projection. This content image data is also used for producing a composed image. Thus, it is reasonable to put the digital camera and the image processing apparatus in the casing of the projector.

The PC 50 in the above embodiment and modifications is an example, and the PC 50 may be replaced with various equipment on which application software for presentation operates, such as a tablet information terminal and a smart phone. Even without such equipment, the projector 80, for example, may serve the function. In this case, a storage medium where data of a presentation is stored is connected to the projector 80, and the projector 80 performs projection based on this data. At this time, the projector 80 transmits data of the projected image to the image processing apparatus 10 as content image data. The image processing apparatus 10 may also serve the function of the PC 50. In this case, the storage medium where data of a presentation is stored is connected to the image processing apparatus 10, and the data is stored in the large capacity storage 13. The image processing apparatus 10 transmits content image data to the projector 80 based on the data.

The above modifications may be combined in various ways, and any of the modifications and those combinations may be combined with any of the above embodiment or modifications.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising a hardware processor, the hardware processor being configured to:
acquire a captured image of an area that includes a display area in which content is displayed by a display device and a peripheral area of the display area;
acquire content image data corresponding to the content;
specify the display area in the captured image;
produce process information based on the captured image, the process information including information of at least one of a color tone of the captured image and a color tone of an image that is based on the content image data; and
perform image processing that includes combining the image that is based on the content image data with the display area of the captured image by using the process information, and adjusting the color tone of at least one of the captured image and the image that is based on the content image data in such a manner that the color tone of the captured image matches the color tone of the image that is based on the content image data in the combined image.

2. The image processing apparatus according to claim 1, wherein the display area changes with time based on the captured image.

3. The image processing apparatus according to claim 2, wherein the hardware processor is configured to specify the display area that changes with time by comparing an image of an initial display area in the captured image with the content image data, the initial display area being the display area in an initial state.

4. The image processing apparatus according to claim 1, wherein the hardware processor is configured to perform the image processing of the adjusting the color tone on at least a part of an edge of the display area in the combined image.

5. The image processing apparatus according to claim 1, wherein the hardware processor is configured to acquire change information for the image processing from the display device that performs image processing to the content and displays the content, and perform image processing based on the change information.

6. An image processing apparatus comprising a hardware processor, the hardware processor being configured to:
acquire a captured image of an area that includes a display area in which content is displayed by a display device and a peripheral area of the display area;
acquire content image data corresponding to the content;
specify the display area in the captured image;
produce process information based on the captured image;
perform image processing that includes combining an image based on the content image data with the display area of the captured image by using the process information;
specify an indicated position in the display area based on the captured image;
produce a superimposition image based on the indicated position, wherein the superimposition image includes at least one of a figure indicating the indicated position and a figure indicating a track of the indicated position; and
combine the superimposition image with an image produced by combining the captured image with the image based on the content image data.

7. The image processing apparatus according to claim 6, wherein the content includes a plurality of pages, and
wherein the hardware processor is configured to newly produce, when a page of the content is changed, the superimposition image in which the figure indicating the track of the indicated position is deleted.

8. An image processing apparatus comprising a hardware processor, the hardware processor being configured to:
acquire a captured image of an area that includes a display area in which content is displayed by a display device and a peripheral area of the display area;
acquire content image data corresponding to the content;
specify the display area in the captured image;
produce process information based on the captured image;
perform image processing that includes combining an image based on the content image data with the display area of the captured image by using the process information;
specify an indicated position in the display area based on the captured image, wherein the indicated position is one of a bright point of a laser pointer and a position specified by a movement of a user;
produce a superimposition image based on the indicated position; and
combine the superimposition image with an image produced by combining the captured image with the image based on the content image data.

9. A projector comprising:
the image processing apparatus according to claim 1;
a projection unit as the display device that outputs an image to be projected on the display area based on the content image data; and
an image capture unit that generates the captured image.

10. An image processing method implemented by using an image processing apparatus, the method including:
acquiring a captured image of an area that includes a display area in which content is displayed by a display device and a peripheral area of the display area;
acquiring content image data corresponding to the content;
specifying the display area in the captured image;
producing process information based on the captured image, the process information including information of at least one of a color tone of the captured image and a color tone of an image that is based on the content image data; and
performing image processing that includes combining the image that is based on the content image data with the display area of the captured image by using the process information, and adjusting the color tone of at least one of the captured image and the image that is based on the content image data in such a manner that the color tone of the captured image matches the color tone of the image that is based on the content image data in the combined image.

11. A non-transitory computer-readable storage medium storing an image processing program to be executed in an image processing apparatus, the image processing program controlling the image processing apparatus to execute functions comprising:
acquiring a captured image of an area that includes a display area in which content is displayed by a display device and a peripheral area of the display area;
acquiring content image data corresponding to the content;
specifying the display area in the captured image;
producing process information based on the captured image, the process information including information of at least one of a color tone of the captured image and a color tone of an image that is based on the content image data; and performing image processing that includes combining the image that is based on the content image data with the display area of the captured image by using the process information, and adjusting the color tone of at least one of the captured image and the image that is based on the content image data in such a manner that the color tone of the captured image matches the color tone of the image that is based on the content image data in the combined image.

\* \* \* \* \*